Dec. 7, 1937.  A. J. MEYER  2,101,554
INTERNAL COMBUSTION ENGINE AND INJECTING DEVICE THEREFOR
Filed Sept. 28, 1933
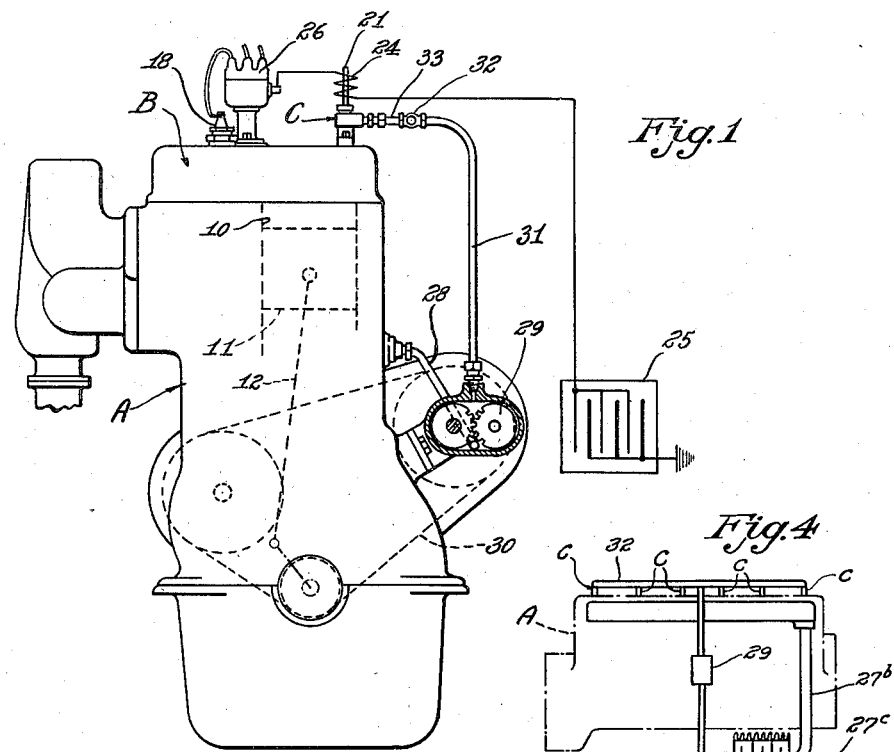
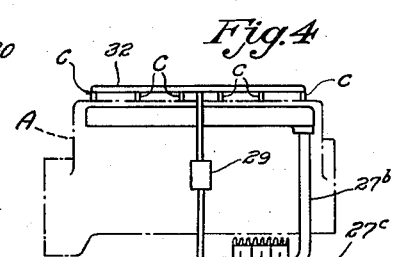
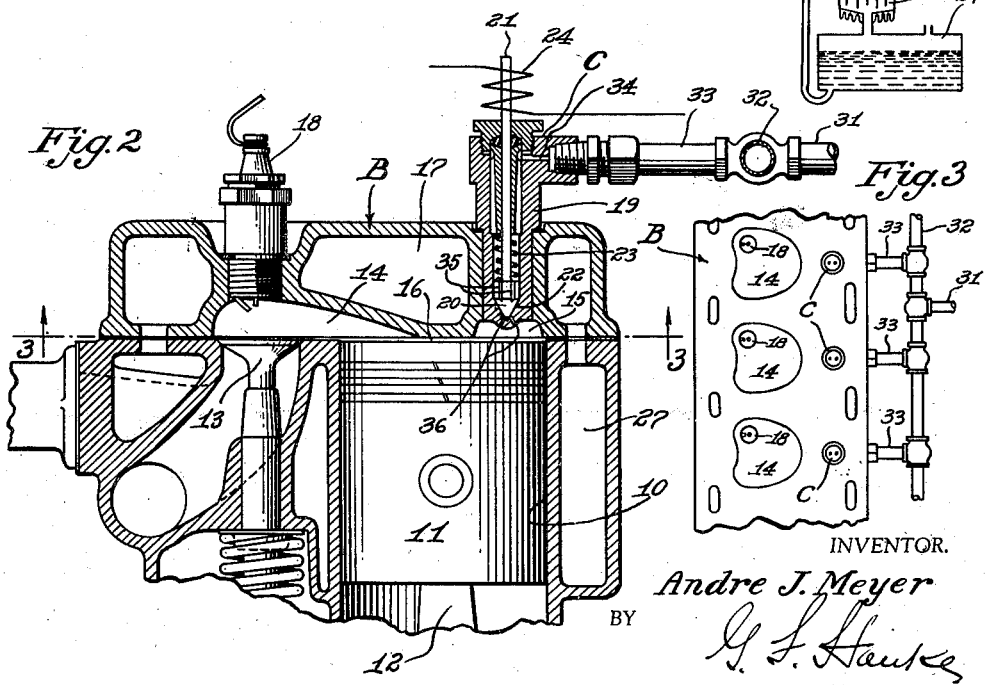
INVENTOR.
Andre J. Meyer
BY
ATTORNEY.

Patented Dec. 7, 1937

2,101,554

UNITED STATES PATENT OFFICE 2,101,554

INTERNAL COMBUSTION ENGINE AND INJECTING DEVICE THEREFOR

Andre J. Meyer, Grosse Pointe Village, Mich., assignor to Continental Motors Corporation, Detroit, Mich., a corporation of Virginia Application September 28, 1933, Serial No. 691,271

4 Claims. (Cl. 123—25)

This invention relates to engines and methods of operating same and refers more particularly to improvements in engine combustion chambers and a method of burning fuel mixture charges in engine combustion chambers.

In internal combustion engines of the hydrocarbon fuel mixture type, it is well known that the power developed by the engine increases with an increase in compression ratio but in the ordinary conventional type of engine a compression ratio of something in the neighborhood of 5 to 1 or 6 to 1 is provided, the chief limiting factor on further increases of compression ratio being the tendency of the fuel mixture charge to detonate. It is generally understood that when a fuel mixture charge is fired by the usual spark plug or other igniting device in an engine combustion chamber, the flame spreads from the source of ignition in the general form of a growing sphere and the unburned portion of the charge in advance of the flame curtain is subjected to an increasing pressure and temperature. If the compression ratio is carried beyond ordinary limits, this increase in pressure and temperature causes self ignition or detonation, and the critical region or zone for such disturbance is found in that portion of the charge which is last to burn.

It is an object of my invention to provide means and methods for preventing this excessive increase in pressure and temperature at the critical point in the fuel mixture charge and thereby to permit operation of the engine on a materially increased compression ratio with resulting increase in power output, fuel economy, and other desirable characteristics of engine performance.

In carrying out my invention, I introduce a cooling fluid preferably in the form of a non-combustible liquid, into the vicinity of the fuel mixture charge which is last to burn, or, in other words, which is most remote from the source of flame propagation, excessive temperature rise in such critical vicinity being prevented by the latent heat of vaporization occurring when the injected liquid is vaporized in advance of the flame travel to the critical regions of the combustion chamber. None of the heat developed by the combustion process is lost in vaporizing the injected liquid, and any heat supplied to the injected liquid in excess of the latent heat of vaporization is also not lost since such heat is available for useful work on the engine piston.

In carrying out my invention in one embodiment, I have provided an electrically controlled injection apparatus for the cooling liquid, the injector being energized at the same time that the spark plug associated with the same combustion chamber is energized as will be more fully understood from the following detailed explanation of this embodiment of my invention.

In order to further explain my invention in detail, I have illustrated one embodiment thereof in the accompanying drawing, in which:

Fig. 1 is an end elevation view of a typical engine illustrating the electrical wiring somewhat diagrammatically, Fig. 2 is a transverse sectional elevation view through one of the engine cylinders and associated combustion chamber, Fig. 3 is a fragmentary bottom plan view of the cylinder head taken along the line 3—3 of Fig. 2, and Fig. 4 is a diagrammatic view illustrating a modified arrangement for supplying the injecting liquid.

Referring to the drawing, reference character A represents the engine of any suitable type and construction, that illustrated being the well known L-head type in which the intake and exhaust valves are arranged to one side of each cylinder in accordance with the well known practice at this time. Thus, engine A has a plurality of longitudinally aligned cylinders, one of which is shown at 10 in Fig. 2, the cylinder having a working piston 11 operating the usual connecting rod 12 secured at the inner end to the usual crankshaft (not shown). Located to one side of cylinder 10 are the intake and exhaust valves, one of which is illustrated at 13, these valves being suitably actuated in the well known manner.

The cylinder head structure B closes the outer end of cylinders 10 and for the particular type of engine illustrated, I preferably provide the cylinder head with primary and secondary combustion chamber portions 14 and 15 respectively, these portions being preferably separated by a ledge or low clearance portion 16 adapted to be closely approached by piston 11 when the latter is at the outermost limit of its travel as shown in Fig. 2. The ledge 16 provides a flame quenching surface, cylinder head B being water jacketed at 17, the secondary combustion chamber portion 15 thereby being in restricted communication with the primary or principle combustion chamber portion 14. A spark plug 18 or other suitable ignition device is provided for the primary combustion chamber 14, this spark plug being shown located substantially at one end of the combustion chamber transversely of the cylinder head.

In order to introduce the cooling liquid into the secondary combustion chamber portion 15, I have shown an injection device C consisting in a housing 19 adapted to receive a valve 20. This valve has a stem 21, the valve being urged normally to its seat 22 by a spring 23 acting in conjunction with the pressure of the liquid within casing 19. The valve 20 is provided with a plurality of longitudinal grooves or passages 35, and the end wall of the casing 19 has a plurality of comparatively small passages 36 extending therethrough from the valve seat 22 to the chamber 15, as clearly shown in Fig. 2.

The valve 20 is actuated by a solenoid 24 included in the electrical circuit between the usual battery 25 and the distributor 26, the latter functioning in the usual way to cause properly timed energizing of the various spark plugs 18, it being understood that an injection device C is preferably arranged for each of the combustion chambers associated with each cylinder of the engine.

The cooling liquid supplied by the injection devices C is furnished from a suitable source, the illustration in Fig. 1 showing cooling water supplied from jacket 27 through conduit 28 to a pump 29 driven by chain 30 from the engine crankshaft. The liquid placed under pressure by pump 29 is supplied through conduit 31 to a header 32 extending longitudinally of the engine, branch conduits 33 supplying the liquid from header 32 to the inlet 34 of housing 19.

In Fig. 4, the injected liquid is stored in a suitable container 27ª, the engine exhaust passing through pipe 27ᵇ to a separator or condenser 27ᶜ for condensing the liquid previously injected during combustion. The same pump 29 supplies the liquid to header 32, the operation being otherwise the same as described.

When solenoid 24 is energized, the resulting magnetic field produces an upward movement of stem 21 and valve 20 and the water under pressure passes from housing 19 through the grooves or passages 35 and thence is sprayed preferably in a finely divided mist-like form by openings 36 into the secondary combustion chamber portion 15.

The quantity of cooling liquid injected will vary with different engines and will also depend on the degree of compression ratio desired, and I do not limit my invention to any particular ratio of quantities of cooling liquid injected with respect to the quantity of fuel consumed by the engine. If the engine is consuming something in the order of .4 pound of gasoline per brake horsepower per hour, I may employ upwards of .2 pound of water per brake horsepower per hour or, in other words, upwards of ½ of the fuel consumed for this general type of engine. A much lesser quantity of water will produce beneficial results in keeping with the objects of my invention, but by introducing a somewhat greater quantity of water than would otherwise be necessary to obtain improvements, the injection device C need not be as sensitive as it otherwise would have to be when measuring minute quantities of water injected at each cycle in the engine operation. Furthermore, as stated hereinbefore, any heat applied to the water is not lost so that the supplying of a limited amount of water in excess of requirements does not seriously affect the beneficial results obtained. The volume of the secondary combustion chamber portion 15 is preferably relatively small compared with that of the primary combustion chamber portion 14.

In operation, assuming that piston 11 has undergone its compression stroke as shown in Fig. 2, the distributor 26 causes sparking of plug 18 so as to ignite the charge and simultaneously solenoid 24 is energized to cause injection of a small quantity of the cooling liquid into the secondary combustion chamber 15. The fuel mixture charge in chamber portion 15 is thus maintained relatively cool and at a sufficiently low temperature so as to prevent detonation and to permit a substantial increase in the compression ratio employed.

I desire to point out that in its broader aspects, my invention is not limited to the particular type of engine illustrated or to the particular form of apparatus, as various changes and modifications will be apparent from the teachings of my invention and within the scope of the appended claims.

What I claim as my invention is:

1. In an internal combustion engine having a cylinder structure and a piston structure associated therewith, a cylinder head closing one end of the cylinder, said head having primary and secondary combustion chamber portions, igniting means for said primary portion, and means for injecting a cooling liquid into said secondary portion.

2. In an internal combustion engine, a cylinder, a cylinder head structure, said cylinder and cylinder head structure cooperating to provide a combustion chamber having primary and secondary combustion chamber portions and a restricted zone intermediate said portions, igniting means for the primary combustion chamber portion, and means for admitting a cooling fluid into the secondary combustion chamber portion which contains the fuel charge last to burn from the influence of said igniting means, said igniting means and said cooling fluid admitting means acting substantially simultaneously.

3. In an internal combustion engine, a cylinder and a cylinder head structure cooperating therewith to provide a combustion chamber having primary and secondary combustion chamber portions and a restricted zone located intermediate said portions, a spark plug for the primary combustion chamber portion, electrically controlled means for injecting a cooling liquid into the secondary combustion chamber portion which contains the fuel charge last to burn under the influence of said spark plug, and means for energizing said spark plug and said injecting means substantially simultaneously.

4. In an L-head engine having a cylinder and piston working therein, a cylinder head closing said cylinder above said piston, said head having a valve controlled primary combustion chamber communicating with the cylinder and offset to one side thereof, said head having a secondary combustion chamber and a ledge portion intermediate said primary and secondary portions, said ledge portion closely overlying said piston when the latter is in the maximum outward position of its movement, a spark plug for said primary combustion chamber portion, and means for introducing a cooling liquid to said secondary combustion chamber portion.

ANDRE J. MEYER.